United States Patent

[11] 3,583,360

| [72] | Inventor | Andre Wehrung |
| | | Des Plaines, Ill. |
| [21] | Appl. No. | 774,305 |
| [22] | Filed | Nov. 8, 1968 |
| [45] | Patented | June 8, 1971 |
| [73] | Assignee | Sun Electric Corporation |

[54] PRECISION ADJUSTABLE EXCURSION LIMITERS
9 Claims, 4 Drawing Figs.

[52] U.S. Cl. .................................................. 116/136.5,
73/178, 116/129, 324/154
[51] Int. Cl. ................................................... G01d 13/22
[50] Field of Search ........................................... 116/129,
124, 136.5; 324/154, 155, 156, 115, 154.1; 73/178

[56] References Cited
UNITED STATES PATENTS

| 2,704,349 | 3/1955 | Sheehan .................... | 324/154X |
| 2,793,607 | 5/1957 | Brown et al. ............... | 116/136.5 |
| 2,926,306 | 2/1960 | Stegner .................... | 324/154 |
| 2,985,832 | 5/1961 | Wintermute et al. ......... | 324/154X |
| 3,049,668 | 8/1962 | Borell ..................... | 116/136.5X |
| 3,289,475 | 12/1966 | Kenyon .................... | 33/222X |
| 3,390,332 | 6/1968 | Rappoccio ................. | 324/154X |

FOREIGN PATENTS

| 658,125 | 10/1951 | Great Britain ............. | 324/154.1 |

Primary Examiner—Louis J. Capozi
Attorneys—Molinare, Allegretti, Newitt and Witcoff ABSTRACT: Precision adjustable excursion limiters for a moveable element include a pair of arms pivotally mounted on an indicator drive assembly cover plate. One end of the arms are pivotally mounted to and extend through the cover plate to provide for selective movement of the arms from the front of the plate and a bumper extends from the other end of the arms and is selectively moveable in the path of movement of the indicator element to limit movement of the element.

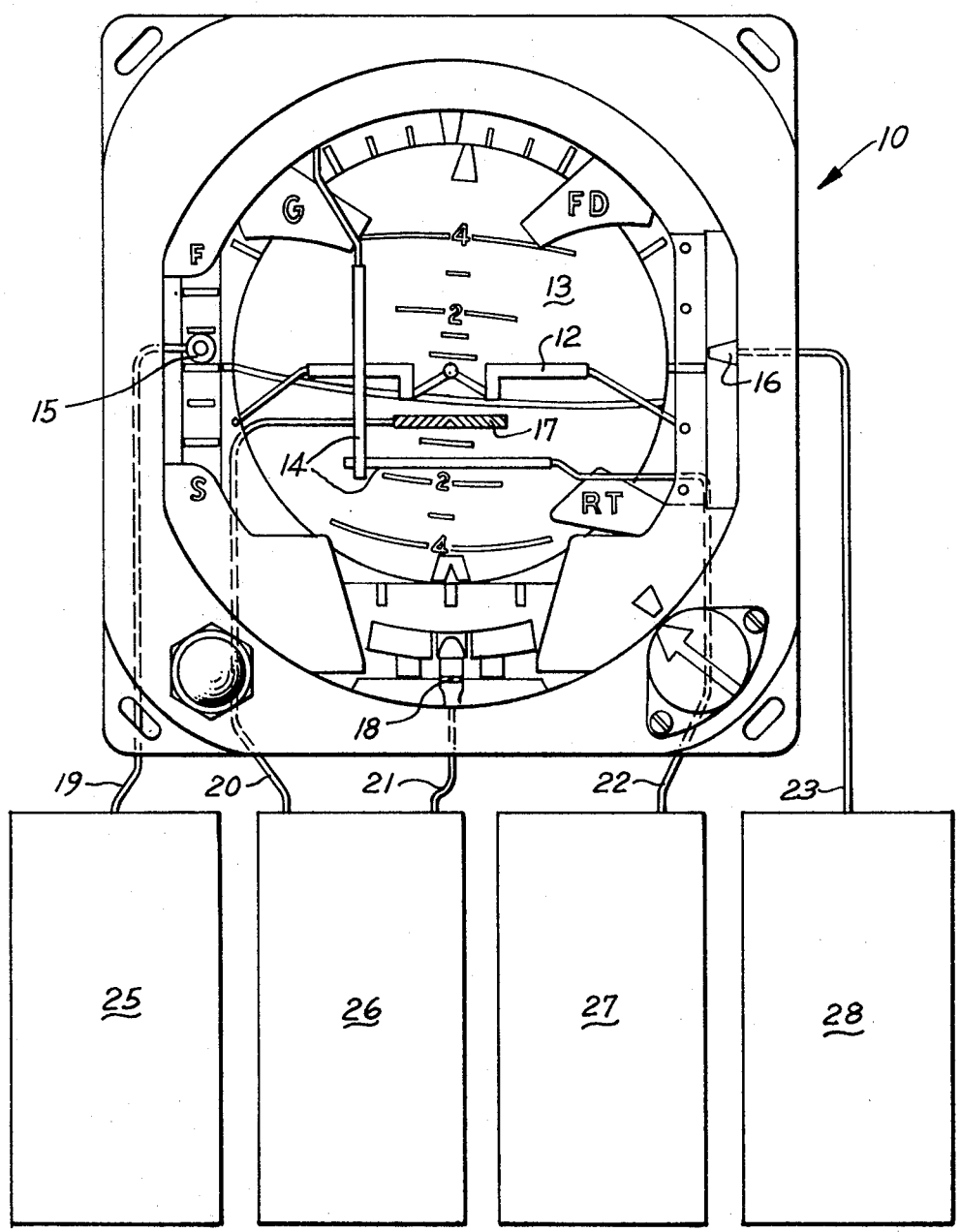

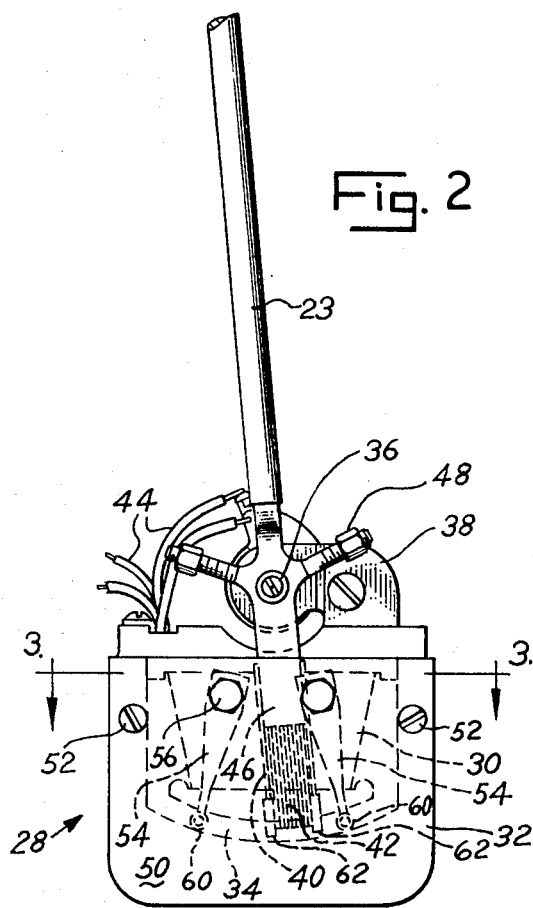
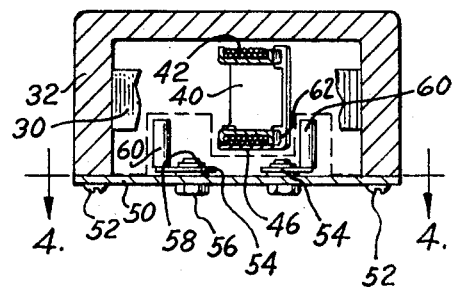
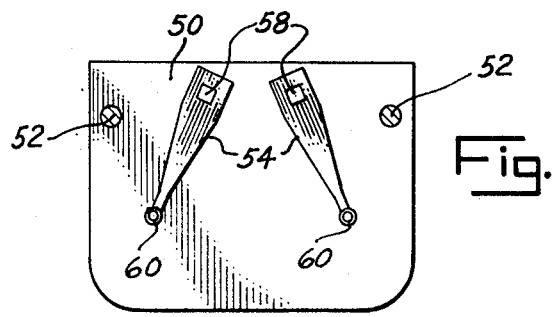

PRECISION ADJUSTABLE EXCURSION LIMITERS

BACKGROUND OF THE INVENTION

This invention relates to adjustable indicator stops and, more particularly, to precision adjustable excursion limiters for selectively limiting the movement of a moveable element in indicating apparatus.

In the advance of modern sophisticated vehicles, such as large high-speed jet aircraft and the like, indicating devices, gauges, and other equipment needed by the operator or pilot in a course of operating the vehicle have become more numerous, complex and difficult to properly locate for optimum usage in the frequently less-than-adequate cockpit or control area of the vehicle. Of necessity, a substantial number of such devices must frequently be located in a small confined area due to inadequate space availability or in the interest of the concentration of displays to reduce the readout and response time of the pilot or operator. As a result individual information display devices have become quite complex, a single such device frequently being capable of a multitude of information display indications. For example, attitude director indicators utilized in modern jet aircraft, display on a single display device a multitude of varied information items such as pitch and roll attitude, flight director information, speed command indication, inclinometer information, and radio altitude information among others. Such multiple item display generally necessitates a plurality of individual indicator element driving assemblies to operate the individual display components of the multiple display device. Consequently the display devices and their driving assemblies are frequently cramped into close proximity to each other in a small compact space.

To prevent overtravel and possible consequent damage to various indicator elements and their drive assemblies, indicator element excursion limiters or stops must generally be employed in the above-described multiple display systems. In the past such limiters have taken the form of screws which have either been mounted for lateral adjustment toward and away from the moveable indicator element at the top of the magnet assembly, where the drive assembly is of the electromagnetic type, or have been mounted for lateral movement to varying depths within the gap between the magnet and magnetic yoke of such assemblies. During extreme movements of the indicator element, the screw tips are contacted by the element and act as limit stops. Such prior constructions suffer from a number of disadvantages, particularly where they are employed in such compact systems. Where the stop screws have been located above the magnet of the drive assembly, they are subject to contamination and damage, since they are not afforded the protection of the drive assembly envelope. Also such stops have been prone to overtravel of the indicator element under extreme overload conditions, since the location of the stop action engagement of such stops is closely adjacent the pivot axis of the indicator element. Where the stop screws extend laterally inwardly from the magnetic yoke into the gap between the yoke and the magnet of the drive assembly, the yoke must be tapped to accommodate the screws. Such tapping substantially increases the possibility of interference with the operation of the drive assembly due to the increased probability of the presence of minute magnetic particles which are generated during the tapping operation. Moreover, each of the screws protrudes laterally beyond the drive assembly envelope and thus necessitates the provision of additional space to enable the mounting of the various drive assemblies in their final operating position. Finally, in each of the above laterally extending screw constructions, the stop screws must be manipulated from the side of the drive assembly to adjust or readjust the stop positions and thus, where a plurality of drive assembly envelopes are closely positioned adjacent each other as in the complex multiple information display devices, each of the envelopes must be removed from its mounted position to afford access for such adjustment.

The adjustable excursion limiter construction of my invention obviates these numerous disadvantages. The limiter construction of my invention is located entirely within the envelope of the indicator drive assembly substantially reducing the probability of contamination and damage of the stops. Moreover, the limiter construction incorporating the principles of my invention obviates the necessity of tapping the yoke or other magnetic components of the drive assembly and is capable of adjustment over the entire range of movement of the moveable indicator element. Also, the limiter construction of my invention may be readily adjusted from the front cover plate of the drive assembly obviating the need for disassembly of the drive assembly or removal of the assembly from its finally mounted position to effect adjustment of the stops. Moreover, the limiter construction of my assembly is simple in construction and inexpensive to manufacture and is capable of being permanently mounted on a major component of the drive assembly, thus obviating the possibility of loss of the stop elements due to inadvertent detachment from the assembly. Finally, the location of the stop action engagement of my invention is closely adjacent the gap of the drive assembly in a position substantially spaced from the pivot axis of the indicator element, optimizing the stopping action and preventing overtravel of the indicator element under extreme overload conditions.

SUMMARY OF THE INVENTION

In a principal aspect, the precision adjustable excursion limiter incorporating the principles of my invention comprises an indicating apparatus having means for moving a pivotally moveable indicator element and a fixed assembly having a magnet and magnetic yoke spaced from each other to define a gap. A moveable assembly carrying the indicator element is moveable in the gap and an arm is pivotally mounted on the fixed assembly and includes means for pivotally moving the arm into one of a plurality of selected locations in the path of travel of that part of the moveable assembly to which is moveable adjacent the gap limit contact and the movement of the moveable assembly.

These as well as other objects, features and advantages of the invention will become evident when considering the following detailed description.

BRIEF DESCRIPTION OF THE DRAWINGS

In the course of this description, the drawings will frequently be referred to in which:

FIG. 1 is an overall view of a flight information display device of the multiple item display type having a plurality of indicator element drive assemblies;

FIG. 2 is a fragmentary elevation view of one of the drive assemblies of FIG. 1;

FIG. 3 is a cross sectioned plan view of the indicator drive assembly taken along line 3-3 of FIG. 2; and FIG. 4 is a cross sectioned elevation view of the back of the cover plate of the drive assembly taken along line 4-4 of FIG. 3.

DESCRIPTION OF THE PREFERRED EMBODIMENT

Referring to FIG. 1, an overall multiple item information display arrangement is shown in the form of an aircraft attitude director indicator display device wherein a single indicator 10 is employed to display a plurality of information items. For example, such display indicator may include a miniature airplane symbol 12 depicting the wings and fuselage of the aircraft, an attitude sphere 13, flight director bars 14, a speed command display 15, a glide slope display 16, a radio altitude display 17, and an inclinometer 18 among other displays. Each of these displays is arranged to provide an indication of certain desired information, each information display component being designed to cooperate with one or more of the other display components to provide an integrated, concise and compact information display to the pilot. A plurality of the various display components are each mechanically controlled by at least one of a plurality of moveable indicator elements 19 through 23 which, in turn, are each driven by at least one of a plurality of indicator drive assemblies 25, 26, 27 and 28. For example, the glide slope display 16 is moved in response to movement of indicator element 23 which is driven by drive assembly 28. Each of the drive assemblies 25 through 28 are closely positioned in relation to each other and to the display indicator 10 in a small compact space and usually in a single panel in the control area of the aircraft.

Referring to FIG. 2 drive assembly 28 is shown in more detail. Drive assembly 28 is generally of the conventional electromagnetic actuated and operated type and comprises a permanent magnet 30 mounted within a magnetic yoke 32 in spaced relationship thereto to provide a gap 34 between the magnet 30 and the yoke 32. The indicator element or pointer 23 is pivotally attached at 36 to a mounting 38 which is stationarily carried on the drive assembly envelope. A moveable looplike channel member 40 encircles the magnet 30 and carries a plurality of turns of wire 42 which are adapted to receive electrical signals entering through signal conductors 44 from an appropriate signal generating source, to produce a known electromagnetic deflection of the channel 40. The end 46 of the indicator element 26 is fixedly attached to the channel member 40 and moves therewith about the pivot 36 when the channel member is deflected. The indicator element 23 may also carry appropriate adjustable balancing devices 48 for adjusting the balance of the element.

A face cover plate 50 is mounted upon the front of yoke 32, as by screws 52, to form a substantially enclosed drive assembly envelope and a pair of tapered stop arms 54 are pivotally mounted to the interior face of the cover plate between the cover plate and the magnet 30. The mounting includes an adjusting head 56 located on the exterior front face of the cover plate, the head being shaped to receive a suitable adjusting tool. A square pin 58, integrally formed on the head 56, extends through an aperture in the cover plate 50 and through a square aperture formed in the upper portion of the stop arm 54, the stop arm being press fitted onto the pin to form an integral keyed structure therewith. Fixed to the opposite end of each stop arm 54, is a ceramic bumper 60 which is generally cylindrical in shape and extends in a direction perpendicular to the stop arm and axially into the gap 34 formed between the magnet 30 and the yoke 32. Complimentary bumpers 62, also preferably formed of a ceramic material, are carried on the channel member 40 and are arranged to contact bumpers 60 when the indicator element is moved toward its extreme travel positions.

Each of the stop bumpers 60 may be readily adjusted form the front of the drive assembly by rotating the adjusting head 56 in the clockwise or counterclockwise direction, as viewed in FIG. 2, to expand or reduce the range of travel of the indicator element. It will readily be seen that the point of contact of the bumpers 60 with bumpers 62 is spaced a substantial distance from the pivot axis 36 of the indicator element, substantially reducing the possibility of overtravel under extreme overload conditions. Moreover no portion of the stop arms 54 extends laterally of the drive assembly envelope and the stop construction is protectively located within the envelope.

Although the preferred embodiment of adjustable pointer excursion limiter has been described in terms of a drive assembly for an aircraft attitude director indicator, it will be readily apparent that pointer excursion limiters constructed in accordance with the principles of my invention may be used in other information display arrangements. Moreover, it should be understood that the embodiment described is merely illustrative of one of the applications of the principles of my invention. Numerous modifications may be made by those skilled in the art without departing from the true spirit and scope of the invention.

What I claim is:

1. In an indicating apparatus having means for moving a moveable indicator element, a fixed assembly having a magnet and a magnetic yoke spaced therefrom to define a gap therebetween, and a moveable assembly including said moveable indication element, at least a portion of said moveable assembly being moveable in and adjacent said gap to pivot said indicator element about a pivot axis, and excursion limiting means for limiting the movement of said indication element, the improvement in said excursion limiting means comprising:
   at least one stop arm pivotally mounted on said fixed assembly, and
   means for pivotally moving said stop arm to selectively position a portion of said stop arm adjacent said gap in one of a plurality of selected locations in the path of movement of said portion of said moveable assembly which is moveable adjacent said gap to contact and limit the movement of said assembly at said one location.

2. The apparatus of claim 1 wherein the pivot axis of said indicator element and the pivot axis of said stop arm are substantially parallel to each other.

3. The apparatus of claim 1 wherein said portion of said stop arm includes bumper means adjacent said gap and extending in a direction substantially parallel to the pivot axis of said stop arm, said bumper means being positioned for contacting said portion of said moveable assembly adjacent said gap to limit the movement of said assembly.

4. The apparatus of claim 3 wherein said moveable assembly also includes bumper means adapted to contact the stop arm bumper means, each of said bumper means being formed of a ceramic material.

5. The apparatus of claim 1 wherein the pivot axis of said stop arm is located intermediate the pivot axis of said indicator element and said portion of said stop arm.

6. The apparatus of claim 1 wherein said fixed assembly includes a face cover spaced from said magnet, and said means for pivotally moving said stop arm mounts said stop arm on said face cover for pivotal movement of said stop arm in the space between the face cover and the magnet.

7. The apparatus of claim 1 including a pair of said stop arms, said moveable assembly being moveable between said portion of each of said stop arms.

8. In an indicating apparatus having means for moving a moveable assembly which includes a pivotally moveable indicator element,
   a cover plate covering said means and lying in a plane which is substantially perpendicular to the pivot axis of said indicator element, and
   excursion limiting means including at least one pivotally moveable stop arm,
   mounting means pivotally mounting said stop arm to one face of said cover plate, said mounting means being accessible for selective movement from the other face of said cover plate to pivotally position a portion of said stop arm in one of a plurality of selected location in the path of movement of said means for moving said moveable assembly to limit the movement of said assembly and its moveable indicator element at said one location.

9. The apparatus of claim 8 including a pair of said pivotally moveable stop arms, said moveable assembly being moveable between said portion of each of said stop arms.